June 3, 1947.　　　J. A. KENNEDY　　　2,421,734
TEXTILE SPINDLE
Filed Oct. 24, 1944
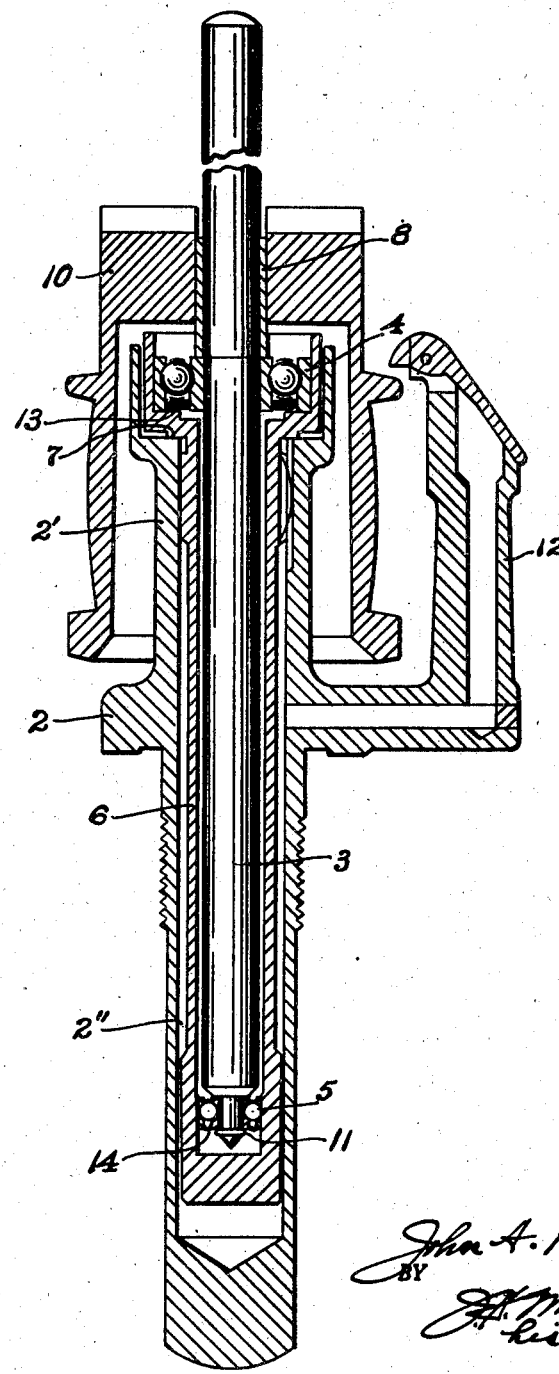
INVENTOR.
John A. Kennedy,
BY
his Atty.

Patented June 3, 1947

2,421,734

UNITED STATES PATENT OFFICE 2,421,734

TEXTILE SPINDLE

John A. Kennedy, Saco, Maine, assignor to Saco-Lowell Shops, Boston, Mass., a corporation of Maine Application October 24, 1944, Serial No. 560,118

5 Claims. (Cl. 308—228)

This invention relates to spindles of the type used in spinning and twister frames.

It is the chief object of the invention to improve the efficiency of such spindles. A careful analysis of the various areas where friction is created in the normal operation of a spindle discloses the surprising fact that a substantial expenditure of power is involved simply in the rotation of the spindle blade in the body of oil held in the well of the spindle base. This loss of power is quite independent of that expended in the bearings themselves, and it represents energy absorbed in overcoming the frictional resistance of the surface of the spindle blade revolving at a high speed in contact with the surrounding oil bath. The present invention aims to eliminate the friction so created.

The nature of the invention will be readily understood from the following description when read in connection with the accompanying drawing, the single figure of which is a vertical, sectional view of a spindle structure embodying this invention, and the novel features will be particularly pointed out in the appended claims.

The construction illustrated in the drawing comprises a spindle base 2 which may be of the orthodox form. Suspended in it is an oil tight bolster of novel form and assembled in this bolster is a blade 3 supported by upper and lower sets of ball bearings 4 and 5. The bolster comprises a sleeve, closed at its lower end and having at its top an integral concentric enlargement in which the upper ball bearing 4 is housed. The lower face of this enlargement includes a radially extending shoulder which rests on a corresponding shoulder 7 formed just below the upper end of the extension 2' of the tubular spindle base. Above the upper bearing a bushing 8 is pressed or shrunk on the spindle blade where it backs up the inner race of the upper ball bearing. Thus the weight of the spindle blade and its load is transmitted initially to the sleeve 8 and then through the bearing 4 to the bolster and thence to the shoulder 7, this bearing 4 being of the type designed to carry both radial and axial load. Also, the bushing 8 carries the whirl 10, the latter being pressed or shrunk on said bushing. The lower bearing 5 is of the same type as the upper bearing and is held in place by a snap ring 11, or this bearing may be held in place by threading the end of the shaft and using a lock nut between it and the shaft.

In this construction the spindle base is provided with the usual oil well 2'' to which oil may be supplied through a filling tube 12 of the usual construction. However, because the bolster is oil-tight, none of this lubricant finds its way into the interior of the bolster. Both ball bearings 4 and 5 are of the sealed type, that is, they are provided with guards or seals indicated at 13 and 14, respectively, which prevent oil or other lubricant from leaking downwardly out of the bearings. They are packed initially with some suitable grease, such as one of the soft sodium base types of grease designed for use in bearings of this character. It tracks easily after a few revolutions, and thereafter allows the spindle to revolve with very little friction when operated at mill speeds. I have found that such bearings will run for years under mill conditions before they require re-packing.

From the foregoing it will be seen that in this spindle structure the blade is supported in an oil tight one-piece closed end tube or bolster in which it revolves entirely out of contact with lubricating material. Care is taken to prevent even a film of oil collecting on the surface of the blade between the two bearings. In fact, this portion of the blade is highly polished so that it offers a minimum of frictional resistance to the surrounding atmosphere. Thus oil friction which is always present in spindles of the prior art types is eliminated. Careful tests have shown that this amounts to a saving of from substantially 15% to about 17% in power over that required for the same spindle with the same yarn package when oil-lubricated in the usual manner.

The suspended mounting of the bolster in the base, as above described, permits it to have a limited freedom of oscillation necessary for smooth running purposes, and the fact that any such vibratory or oscillatory movement of the bolster is dampened and cushioned by the surrounding body of oil in the base, contributes materially to maintaining these highly desirable smooth-running properties.

While I have herein shown and described a preferred embodiment of my invention, it will be evident that the invention may be embodied in other forms without departing from the spirit or scope thereof.

Having thus described my invention, what I desire to claim as new is:

1. In a spindle for spinning and twister frames, the combination of a spindle base provided with an oil well extending downward therefrom, a bolster supported in said well for limited swinging movement, enabling it to adjust itself automatically to the running requirements of the blade and its load, bearings spaced widely apart axially of the blade and supporting it in said bolster for rapid rotation around its own axis, said bolster being oil-tight, means cooperating with said bearings to seal the lubricant for the bearings in the bearing structures themselves, whereby the entire portion of said blade between said bearings is maintained out of contact with the lubricating material, and a liquid in said well serving to dampen the swinging movements of said bolster, said bearings connecting said bolster and said blade for limited swinging movement in unison.

2. In a spindle for spinning and twister frames, the combination of a spindle base provided with an oil well extending downward therefrom, a bolster supported in said well for limited swinging movement, enabling it to adjust itself automatically to the running requirements of the blade and its load, anti-friction ball bearings spaced widely apart axially of the blade and supporting it in said bolster for rapid rotation around its own axis, said bolster being of one piece construction with a closed lower end and being oil-tight, means cooperating with said bearings to seal the lubricant in the bearing structures themselves, whereby the entire portion of said blade between said bearings is maintained out of contact with lubricating material, and a liquid in said well serving to dampen the swinging movements of said bolster, said bearings connecting said bolster and said blade for limited swinging movement in unison.

3. In a spindle for spinning and twister frames, the combination of a spindle base provided with an oil well extending downward therefrom, a bolster supported in said well for limited swinging movement, enabling it to adjust itself automatically to the running requirements of the blade and its load, anti-friction bearings spaced widely apart axially of the blade and supporting it in said bolster for rapid rotation around its own axis, said bolster being oil-tight, means comprising guards cooperating with said bearings to seal the lubricant in the bearing structures themselves, whereby the entire portion of said blade between said bearings is maintained out of contact with lubricating material, and a liquid in said well serving to dampen the swinging movements of said bolster, said bearings connecting said bolster and said blade for limited swinging movement in unison.

4. In a spindle for spinning and twister frames, the combination of a spindle base provided with an oil well extending downward therefrom, a bolster suspended in said well for limited swinging movement, enabling it to adjust itself automatically to the running requirements of the blade and its load, ball bearings of the combined radial and axial type spaced widely apart axially of the blade and supporting it in said bolster for rapid rotation around its own axis, said bolster being oil-tight, means cooperating with said bearings to seal the lubricant in the bearing structures themselves, whereby the entire portion of said blade between said bearings is maintained out of contact with lubricating material, and a liquid in said well serving to dampen the swinging movements of said bolster, said bearings connecting said bolster and said blade for limited swinging movement in unison.

5. In a spindle for spinning and twister frames, the combination of a spindle base provided with an oil well extending downward therefrom, a bolster suspended in said well for limited swinging movement, enabling it to adjust itself automatically to the running requirements of the blade and its load, anti-friction bearings spaced widely apart axially of the blade and supporting it in said bolster for rapid rotation around its own axis, the portion of said blade between said bearings being smooth and polished, said bolster being oil-tight, means cooperating with said bearings to seal the lubricant in the bearing structures themselves, whereby the entire portion of said blade between said bearings is maintained out of contact with lubricating material, and a liquid in said well serving to dampen the swinging movements of said bolster, said bearings connecting said bolster and said blade for limited swinging movement in unison.

JOHN A. KENNEDY.

REFERENCES CITED

The following references are of record in the file of this patent:

UNITED STATES PATENTS

| Number | Name | Date |
|---|---|---|
| 1,869,632 | Sweet | Aug. 2, 1932 |
| 2,015,784 | Brown | Oct. 1, 1935 |

FOREIGN PATENTS

| Number | Country | Date |
|---|---|---|
| 433,137 | Germany | Aug. 23, 1926 |